United States Patent
Idsinga et al.

(10) Patent No.: US 9,360,889 B2
(45) Date of Patent: Jun. 7, 2016

(54) ROUTING SIGNALS VIA HINGE ASSEMBLIES FOR MOBILE COMPUTING DEVICES

(71) Applicant: Intel Corporation, Santa Clara, CA (US)

(72) Inventors: Andy S. Idsinga, Portland, OR (US); Gregory A. Peek, North Plains, OR (US)

(73) Assignee: Intel Corporation, Santa Clara, CA (US)

(*) Notice: Subject to any disclaimer, the term of this patent is extended or adjusted under 35 U.S.C. 154(b) by 160 days.

(21) Appl. No.: 14/142,602

(22) Filed: Dec. 27, 2013

(65) Prior Publication Data
US 2015/0185763 A1 Jul. 2, 2015

(51) Int. Cl.
*G06F 1/16* (2006.01)
*G06F 1/18* (2006.01)

(52) U.S. Cl.
CPC .............. *G06F 1/163* (2013.01); *G06F 1/1681* (2013.01); *G06F 1/1683* (2013.01); *G06F 1/181* (2013.01); *Y10T 16/52* (2015.01); *Y10T 16/522* (2015.01); *Y10T 16/532* (2015.01); *Y10T 16/555* (2015.01)

(58) Field of Classification Search
USPC ............ 455/575.1, 575.3, 90.3, 556.1, 575.8, 455/566, 575.4; 361/679.22, 679.17, 361/679.58, 679.21, 679.41, 679.33, 361/679.59, 679.38, 679.39, 679.01, 361/679.02, 679.34, 679.32, 679.43, 361/679.55, 679.27, 679.28, 679.2, 679.09, 361/679.03, 679.23; 600/301, 457, 459; 463/7; 345/156, 173, 177, 175, 179, 345/32, 419, 168, 213, 915; 439/59, 660, 439/493, 893, 165, 131; 174/75 R, 254, 350, 174/50, 262, 51, 117 F
See application file for complete search history.

(56) References Cited

U.S. PATENT DOCUMENTS

| | | | |
|---|---|---|---|
| 6,536,941 B1 | 3/2003 | Fang | |
| 7,581,833 B2 | 9/2009 | Howell | |
| 7,809,412 B2* | 10/2010 | Carlson | 455/575.1 |
| 8,109,629 B2 | 2/2012 | Howell | |
| 8,971,023 B2 | 3/2015 | Olsson | |
| 2004/0203519 A1 | 10/2004 | Pontoppidan et al. | |
| 2005/0052834 A1* | 3/2005 | Tanaka et al. | 361/681 |
| 2005/0054395 A1* | 3/2005 | Arbisi et al. | 455/575.3 |
| 2005/0237704 A1 | 10/2005 | Ceresoli | |

(Continued)

FOREIGN PATENT DOCUMENTS

| | | |
|---|---|---|
| KR | 10-1999-0046393 | 7/1999 |
| KR | 10-2011-0130958 | 12/2011 |

OTHER PUBLICATIONS

International Search Report and Written Opinion of the International Searching Authority dated Mar. 12, 2015, in International Patent Application No. PCT/US2014/069393, 11 pages.

(Continued)

*Primary Examiner* — Hung Duong
(74) *Attorney, Agent, or Firm* — Blakely, Sokoloff, Taylor & Zafman LLP

(57) ABSTRACT

Embodiments of the invention describe a hinge assembly to rotatably couple a first housing to a second housing, wherein an interconnect extends through the hinge assembly as an incorporated portion of the hinge assembly, the interconnect to communicatively couple a component located in the first housing to a component located in a second housing.

15 Claims, 6 Drawing Sheets

(56) References Cited

U.S. PATENT DOCUMENTS

| | | |
|---|---|---|
| 2005/0239502 A1 | 10/2005 | Swab et al. |
| 2006/0012566 A1 | 1/2006 | Siddeeq |
| 2006/0132382 A1 | 6/2006 | Jannard |
| 2008/0291277 A1 | 11/2008 | Jacobsen |
| 2013/0106603 A1 | 5/2013 | Weast et al. |
| 2013/0176672 A1* | 7/2013 | Richard et al. ........... 361/679.22 |
| 2014/0194702 A1* | 7/2014 | Tran .............................. 600/301 |
| 2014/0218852 A1 | 8/2014 | Alcazar |
| 2015/0038204 A1* | 2/2015 | Dugan et al. ...................... 463/7 |

OTHER PUBLICATIONS

International Search Report and Written Opinion of the International Searching Authority dated Mar. 16, 2015, in International Patent Application No. PCT/US2014/069151, 14 pages.

Notice of Allowance mailed Oct. 5, 2015, in U.S. Appl. No. 14/142,811, 8 pages.

* cited by examiner

ROUTING SIGNALS VIA HINGE ASSEMBLIES FOR MOBILE COMPUTING DEVICES

FIELD

Embodiments of the present invention generally pertain to computing devices and more specifically to mobile computing devices.

BACKGROUND

Mobile computing devices such as wearable computing devices are electronic devices worn by a user. These devices may be worn differently by the user based on the device's intended function. For example, wearable computing devices to track a user's location or activity level may be worn similar to a bracelet, wristwatch or any other similar appropriate form factor. Heads up display (HUD) devices may have a form factor similar to a pair of eyeglasses.

One of the disadvantages of current wearable computing device design is that necessary power and input/output (I/O) interconnections are easily visible, and thus the device cannot completely have the equivalent aesthetic and form factor of a traditionally worn accessory. Furthermore, accessories such as bracelets, watches and eyeglasses require some type of hinge assembly used to open and close the housing of the device when the user puts on or takes off the accessory. This "break" in the wearable device often prevents interconnectivity and power from being provided throughout the device.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as a discussion of other potential embodiments or implementations of the inventive concepts presented herein. An overview of embodiments of the invention is provided below, followed by a more detailed description with reference to the drawings.

DETAILED DESCRIPTION

Embodiments of the invention describe routing signals via hinge assemblies for wearable computing devices. Throughout this specification, several terms of art are used. These terms are to take on their ordinary meaning in the art from which they come, unless specifically defined herein or the context of their use would clearly suggest otherwise. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Figure 1A:
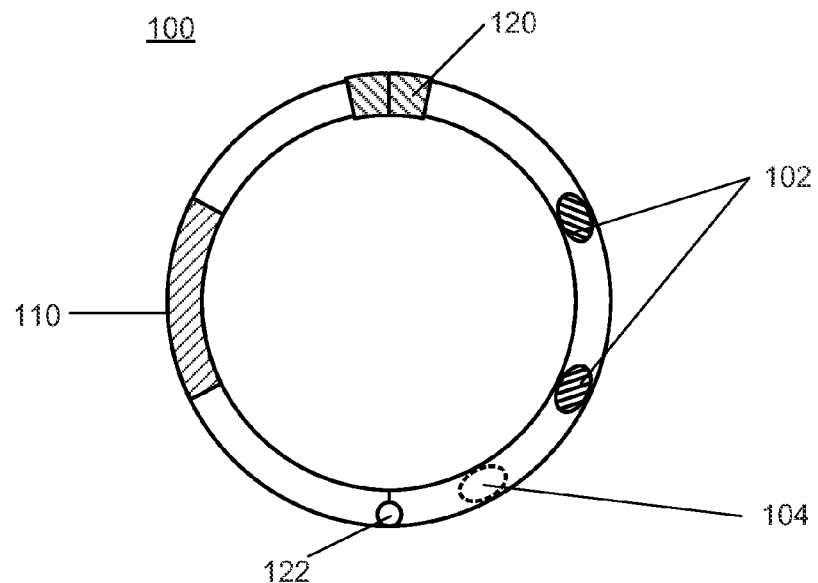
FIG. 1A and FIG. 1B are illustrations of a mobile computing device according to an embodiment of the invention.
Figure 1B:
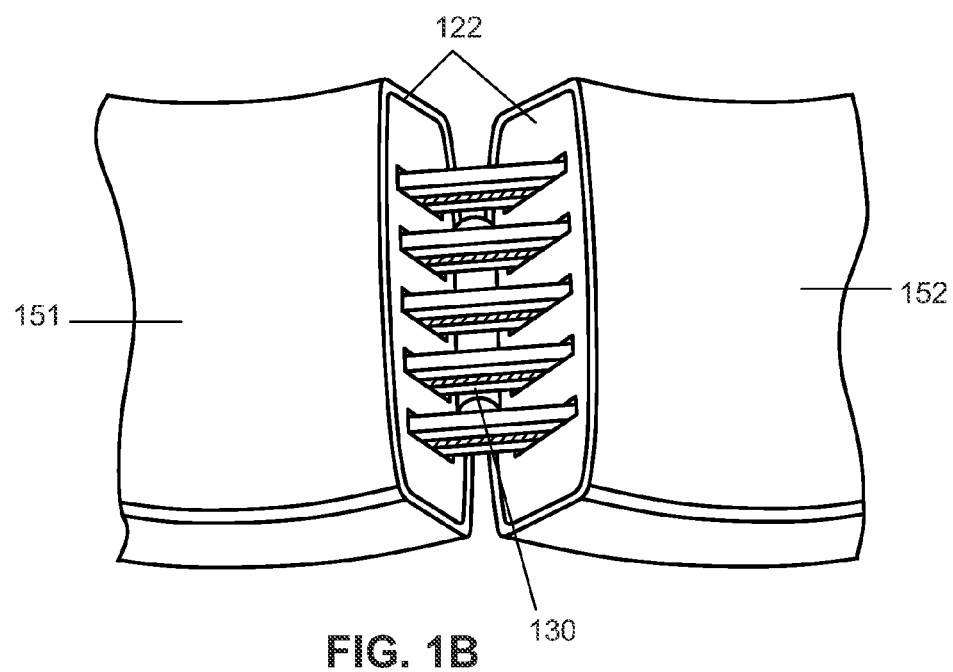

FIG. 1A and FIG. 1B are illustrations of a mobile computing device according to an embodiment of the invention. In the description below, wearable computing devices comprising hinge assemblies are discussed for exemplary purposes only. Embodiments of the invention may be utilized in any mobile computing device comprising a hinge assembly, including non-wearable computing devices such as laptop computers (having a clamshell housing and/or having a rotating display screen utilizing a hinge assembly), tablet/laptop 2-in-1 devices, clamshell mobile phones, etc.

In this embodiment, wearable computing device 100 comprises a wearable band for wearing on a user's wrist, and may comprise any rigid or flexible material. This form factor may be used for several types of devices. For example, in some embodiments, the wearable computing device comprises a wristwatch form factor, having a display in place of a watch face, user input/output (I/O) components (or in some embodiments, the display comprises a touchscreen I/O interface), image sensors, audio output components, computing components such as memory, processor cores, network connectivity circuits, etc.

In this embodiment, device 100 comprises a bracelet form factor, and is described below as a user monitoring device. Said user monitoring device may be used for monitoring and storing data related to the user's activities and other health data.

In this embodiment, device 100 is illustrated in FIG. 1A to include biometric sensors 102 to contact the user's wrist for measuring physiological aspects of the user (e.g., the user's pulse). Device 100 further includes motion sensor 104 (e.g., an accelerometer or gyroscope) for tracking user movements. Device 100 may further include a location sensor to dynamically determine a location of the device/user. Device 100 is shown to further include power supply and computing components 110; said computing components may comprise memory, processor cores, network connectivity circuits, etc.

The above described sensors, power supply and computing components may be used to monitor, and track user data such as activity-related data of the user (e.g., distance traveled and/or pace of the user, any activities related to sleeping, lying, sitting, and standing stationary), physiological data (e.g., heart rate and variability, respiration rate, body temperature), etc. This user data may be stored in the memory of computing components 110.

Device 100 is shown to further include clasp 120 and hinge assembly 122, to open and close the housing of the device to allow the user to put on and take off the device. FIG. 1A illustrates these components in a closed position; when these components are in an open position, portions of device 100 are separated and/or moved away from each other. FIG. 1B illustrates hinge assembly 122 in an open position—i.e., wherein housing members 151 and 152 are moved away from each other.

In this embodiment, interconnect 130 extends through hinge assembly 122, and is provided to route signals between the two separated housing members of device 100. Said interconnect is concealed when hinge assembly 120 is closed to not affect the aesthetic appearance of device 100 when it is worn by the user. Said hinge assembly may further protect interconnect 130 from external elements, such as contaminants and moisture.

In embodiments described below, interconnect 130 may comprise any known input/output (I/O) interconnect, or any device/component interconnect, such as Peripheral Component Interconnect express (PCIe), Serial Advanced Technology Attachment (SATA), Serial Attached SCSI (Small Computer System Interface) (SAS), Universal Serial Bus (USB), Thunderbolt, Inter-Integrated Circuit (I2C), high speed processor interconnects, etc.

Hinge assembly 122 thus separates the housing of device 100 into two members—first member 151 (e.g., which may include the above described power and computing components) and second member 152 (e.g., which may include the above described sensors). In this embodiment, the various computing components of these housing members are to utilize interconnect 130 to exchange data and/or power (i.e., for sensors 102 and 104 to receive power from and transmit sensor data to power and computing components 110). In some embodiments, interconnect 130 comprises an electrical interconnect formed from any suitable semiconductor or metal. For example, computing components 110 and sensors 102 and 104 may be disposed on rigid or flexible substrates (e.g., glass epoxy, silicon, ceramic, Flame Resistant 4 (FR4) printed circuit board (PCB), non-conductive materials such as fiberglass, etc.), and interconnect 130 may comprise conductive lines formed from this substrate, or any other suitable material (e.g., conductive metal lines such as copper traces). In other embodiments, interconnect 130 may comprise an optical interconnect formed from one or more optical fibers having optical waveguide cores.

Thus, interconnect 130 allows computing components included in separate housing members 151 and 152 to be communicatively and/or electrically coupled together. In this embodiment, interconnect 130 is shown to extend through hinge assembly 122 when the hinge assembly is in an open state. In other embodiments, the interconnect does not extend through the hinge assembly, and second member 152 is not powered up when hinge assembly 122 is in an open state. Thus in embodiments comprising metal/silicon electrical interconnects, the conductive lines may, for example, have a length less than the length of the hinge assembly when in an open state; in embodiments comprising optical interconnects, optical fibers in separate housing members may be edge/butt coupled when the hinge assembly is in a closed state, and disconnected when the hinge assembly is in an open state.

Embodiments of the invention thus describe a hinge assembly having an interconnect to route signals between first and second members of a housing of a wearable computing device. Said interconnect may be created when said hinge assembly is formed, or may be added to the hinge (e.g., conductive lines, such as copper traces, laminated onto the hinge, the lamination material providing an insulating layer between the first conductive material and the second conductive material). While the above described embodiment pertains to form factors for wearing on a user's wrist, other embodiments may utilize different form factors.

Figure 2A:
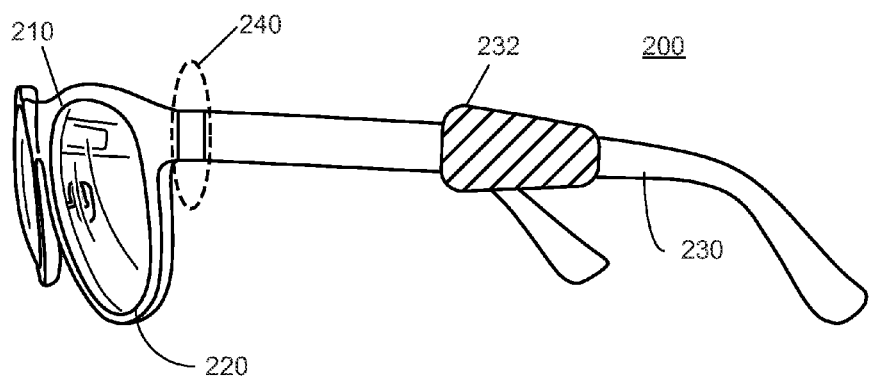
FIG. 2A and FIG. 2B are illustrations of a mobile computing device according to an embodiment of the invention.
Figure 2B:
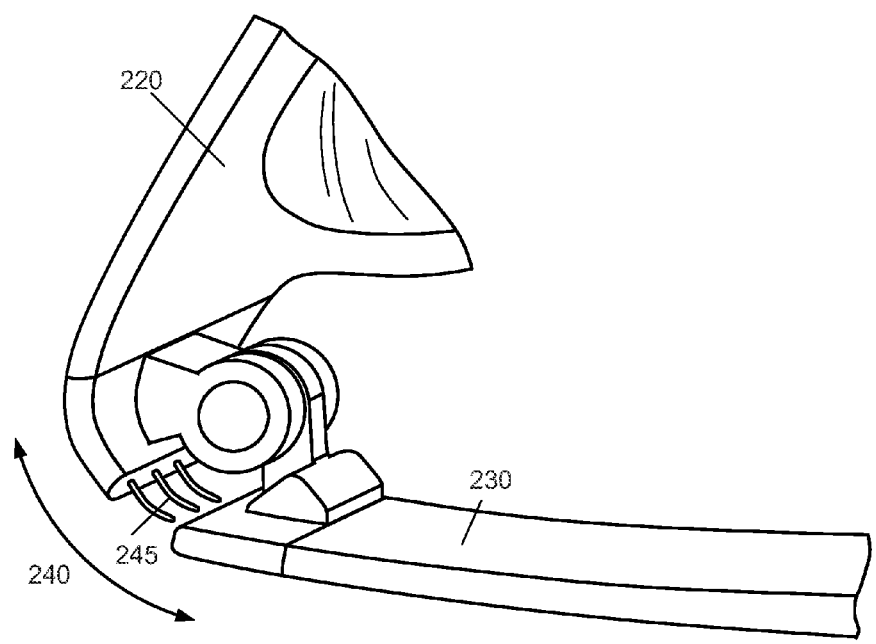

FIG. 2A and FIG. 2B are illustrations of a mobile computing device according to an embodiment of the invention. In this embodiment, device 200 comprises a head mounted display device having a form factor similar to a pair of eyeglasses to be worn on or about the head of a user. Device 200 may be capable of displaying only a computer generated image to the user (i.e., a virtual reality (VR) device), or may be capable of superimposing computer generated images over a real-world view (i.e., an augmented reality (AR) device).

Device 200 comprises eyeglass housing frame 210, which may be formed from any solid material (e.g., plastic or metal) and is shown to include lens frame member 220 and extending side-arm member 230. Lens frame member 220 may include image display components (and additional suitable components, such as image or audio capture sensors), while extending side-arm member 230 may include power supply and computing components 232; said computing components may comprise memory, processor cores, network connectivity circuits, etc.

In this embodiment, interconnect 245 is shown to be disposed within hinge assembly 240 (concealed when the hinge assembly is in a closed state, as shown in FIG. 2A, and at least partially visible when the hinge assembly is in an open state, as shown in FIG. 2B). In this embodiment, said hinge assembly couples side-arm member 230 to lens frame member 220. Interconnect 245 is provided to transfer signals between computing components 232 included in side-arm member 230 to the optical display components of lens frame member 220.

While the embodiments described above describe wearable devices having folding hinges, other embodiments may utilize interconnects that extend through any hinge assembly known in the art.

Figure 3A:
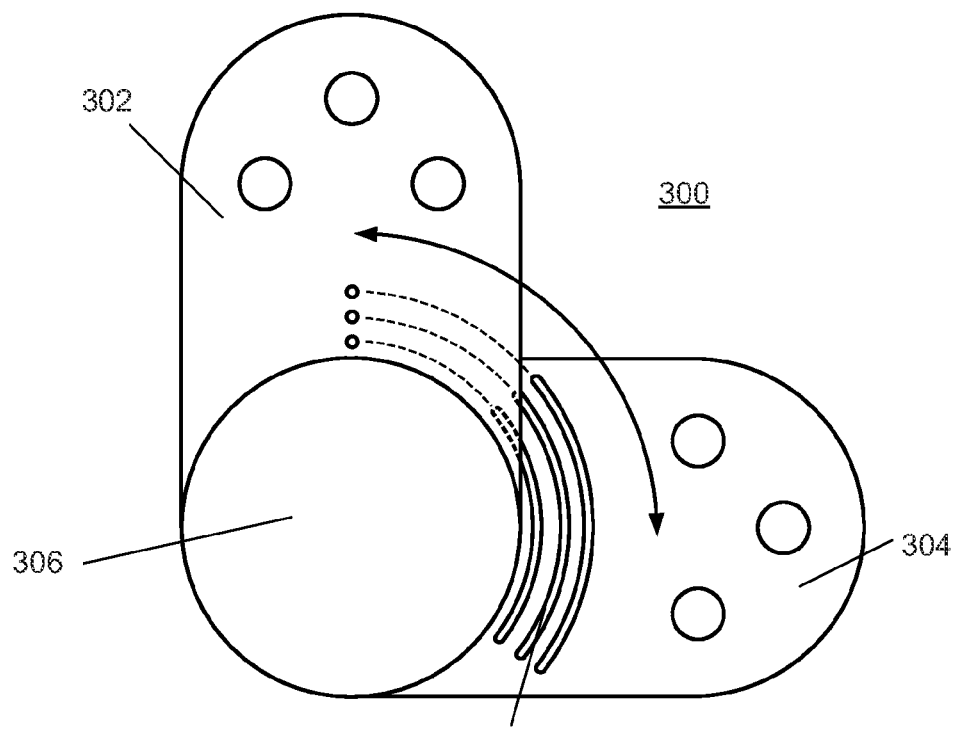
FIG. 3A and FIG. 3B are illustrations of a hinge assembly and an interconnect for a mobile computing device according an embodiment of the invention.
Figure 3B:
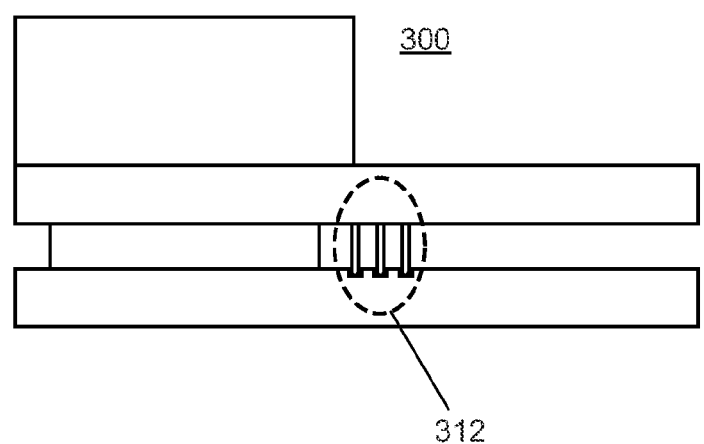

FIG. 3A and FIG. 3B are illustrations of a hinge assembly and an interconnect for a mobile computing device according an embodiment of the invention. In this embodiment, hinge assembly 300 comprises a rotating hinge assembly, wherein first hinge member 302 rotates towards and away from second hinge member 304 via bearing 306.

In this embodiment, an electrical interconnect extends through hinge assembly 300, and is shown to comprise metal lines 312 (shown in the side view illustration of FIG. 3B) and corresponding metal grooves 310 (shown in the top view illustration of FIG. 3A). Thus, the interconnect is concealed when hinge assembly 300 in is a closed state (i.e., when first hinge member 302 is aligned with second hinge member 304), and is partially visible when the hinge assembly is in an open state.

Figure 4A:
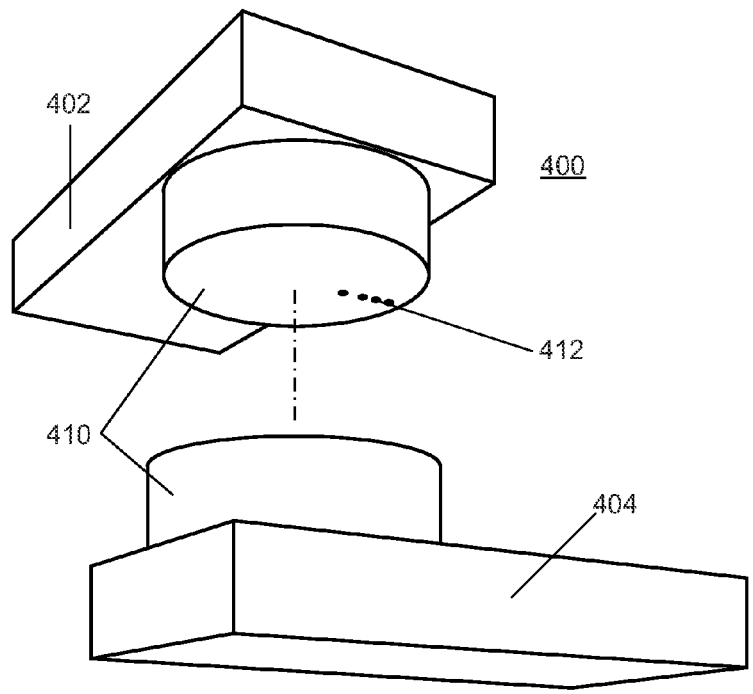
FIG. 4A and FIG. 4B are illustrations of a hinge assembly and an interconnect for a mobile computing device according an embodiment of the invention.
Figure 4B:
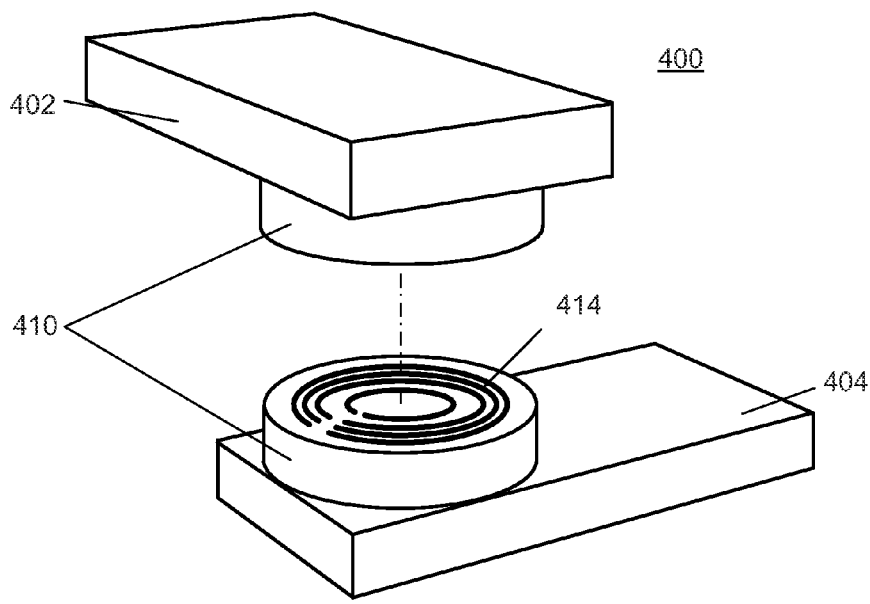

FIG. 4A and FIG. 4B are illustrations of a hinge assembly and an interconnect for a mobile computing device according an embodiment of the invention. In this embodiment, hinge assembly 400 comprises a rotating hinge assembly, wherein first hinge member 402 and second hinge member 404 rotate via bearing assembly 410.

In this embodiment, an electrical interconnect extends through hinge assembly 400, and is shown to comprise metal lines 412 in first hinge member 402 (shown in the illustration of FIG. 4A) and corresponding metal grooves 414 in second hinge member 404 (shown in illustration of FIG. 4B) coupling within bearing assembly 410. Thus, the interconnect is always concealed for hinge assembly 400. Furthermore, the illustrated interconnect is operable for the full range of motion of hinge 400.

Figure 5:
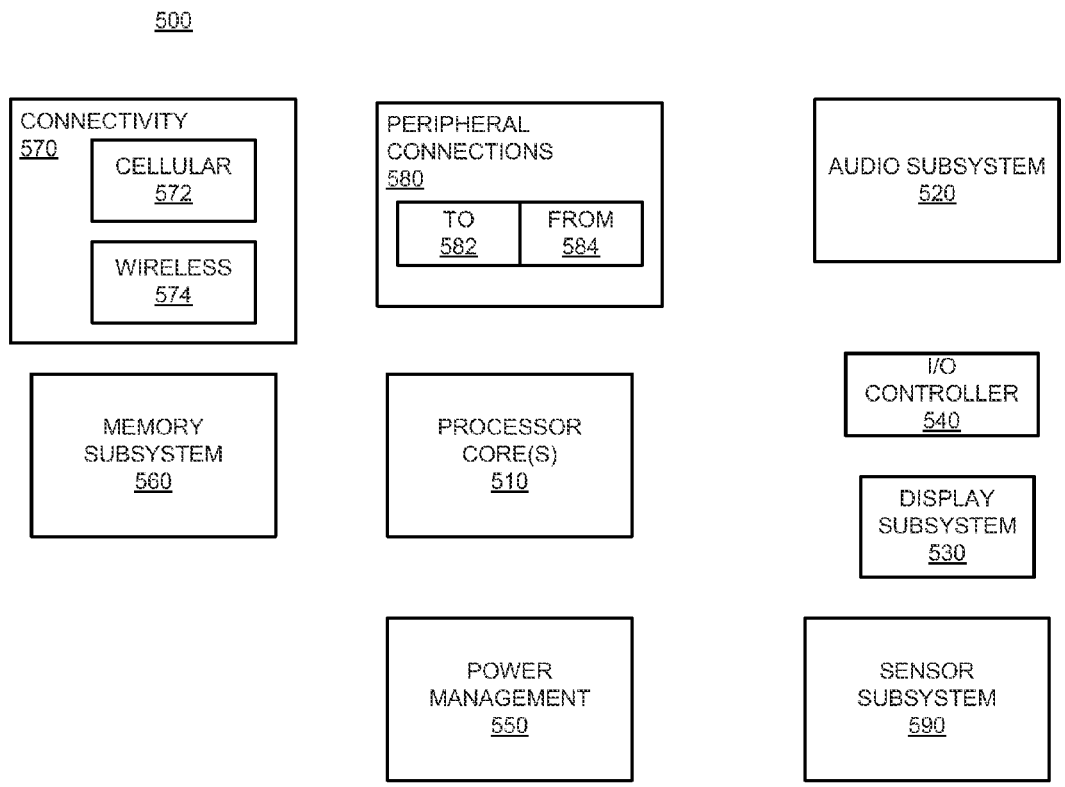
FIG. 5 is a block diagram of computing components of a mobile computing device according to an embodiment of the invention.

FIG. 5 is a block diagram of computing components of a mobile computing device according to an embodiment of the invention. It will be understood that certain of the components are shown generally, and not all components of such a device are shown in device 500. Furthermore, it will be understood that any of the illustrated components may be discrete components or may be components included on a system on a chip (SoC) integrated circuit (IC), and may be communicatively coupled through any direct or indirect means.

Device 500 may comprise any of the wearable computing devices and non-wearable computing devices discussed above. Device 500 includes one or more processor cores 510, which performs the primary processing operations of device 500. Each of processor core(s) 510 can be SoC components, or can be included in one or more physical devices, such as single or multi-core microprocessors, application processors, microcontrollers, programmable logic devices, or other processing means. The processing operations performed by processor core(s) 510 include the execution of an operating platform or operating system on which applications and/or device functions are executed. The processing operations include operations related to I/O (input/output) with a human user or with other devices, operations related to power management, and/or operations related to connecting device 500 to another device. The processing operations may also include operations related to audio I/O and/or display I/O.

In one embodiment, device 500 includes audio subsystem 520, which represents hardware (e.g., audio hardware and audio circuits) and software (e.g., drivers, codecs) components associated with providing audio functions to the computing device. Audio functions can include speaker and/or headphone output, as well as microphone input via any of the audio jacks described above. Devices for such functions can be integrated into device 500, or connected to device 500. In one embodiment, a user interacts with device 500 by providing audio commands that are received and processed by processor core(s) 510.

I/O controller 540 represents hardware devices and software components related to interaction with a user. I/O controller 540 can operate to manage hardware that is part of audio subsystem 520 and/or display subsystem 530. Additionally, I/O controller 540 illustrates a connection point for additional devices that connect to device 500 through which a user might interact with the system. For example, devices that can be attached to device 500 might include microphone devices, speaker or stereo systems, video systems or other display device, keyboard or keypad devices, or other I/O devices for use with specific applications such as card readers or other devices.

As mentioned above, I/O controller 540 can interact with audio subsystem 520 and/or display subsystem 530. For example, input through a microphone or other audio device can provide input or commands for one or more applications or functions of device 500. Additionally, audio output can be provided instead of or in addition to display output. Display subsystem 530 includes a touchscreen, and thus the display device also acts as an input device, which can be at least partially managed by I/O controller 540. There can also be additional buttons or switches on device 500 to provide I/O functions managed by I/O controller 540. Sensor subsystem 590 may comprise any touch sensor (e.g., touch sensors in addition to the touchscreen of display subsystem 530) and/or motion detectors suitable for the wearable computing devices described above.

In one embodiment, I/O controller 540 manages devices such as accelerometers, cameras, light sensors or other environmental sensors, or other hardware that can be included in device 500. The input can be part of direct user interaction, as well as providing environmental input to the system to influence its operations (such as filtering for noise, adjusting displays for brightness detection, applying a flash for a camera, or other features). In one embodiment, device 500 includes power management 550 that manages battery power usage, charging of the battery, and features related to power saving operation.

Memory subsystem 560 includes memory devices for storing information in device 500. Memory can include nonvolatile (state does not change if power to the memory device is interrupted) and/or volatile (state is indeterminate if power to the memory device is interrupted) memory devices. Memory 560 can store application data, user data, music, photos, documents, or other data, as well as system data (whether long-term or temporary) related to the execution of the applications and functions of system 500. Memory 560 further stores firmware images related to boot path operations, and thus may include DRAM devices to store said firmware images as described above.

Connectivity 570 includes hardware devices (e.g., wireless and/or wired connectors and communication hardware) and software components (e.g., drivers, protocol stacks) to enable device 500 to communicate with external devices. The device could be separate devices, such as other computing devices, wireless access points or base stations, as well as peripherals such as headsets, printers, or other devices.

Connectivity 570 can include multiple different types of connectivity. To generalize, device 500 is illustrated with cellular connectivity 572 and wireless connectivity 574. Cellular connectivity 572 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity 574 refers to wireless connectivity that is not cellular, and can include personal area networks (such as Bluetooth), local area networks (such as Wi-Fi), and/or wide area networks (such as Wi-Max), or other wireless communication.

Peripheral connections 580 include hardware interfaces and connectors for implementing non-flash firmware storage support as described above, as well as software components (e.g., drivers, protocol stacks) to make peripheral connections. It will be understood that device 500 could both be a peripheral device ("to" 582) to other computing devices, as well as have peripheral devices ("from" 584) connected to it.

Device 500 may have a "docking" connector to connect to other computing devices for purposes such as managing (e.g., downloading and/or uploading, changing, synchronizing) content on device 500. Additionally, a docking connector can allow device 500 to connect to certain peripherals that allow device 500 to control content output, for example, to audiovisual or other systems. In addition to a proprietary docking connector or other proprietary connection hardware, device 500 can make peripheral connections 580 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

Figure 6:
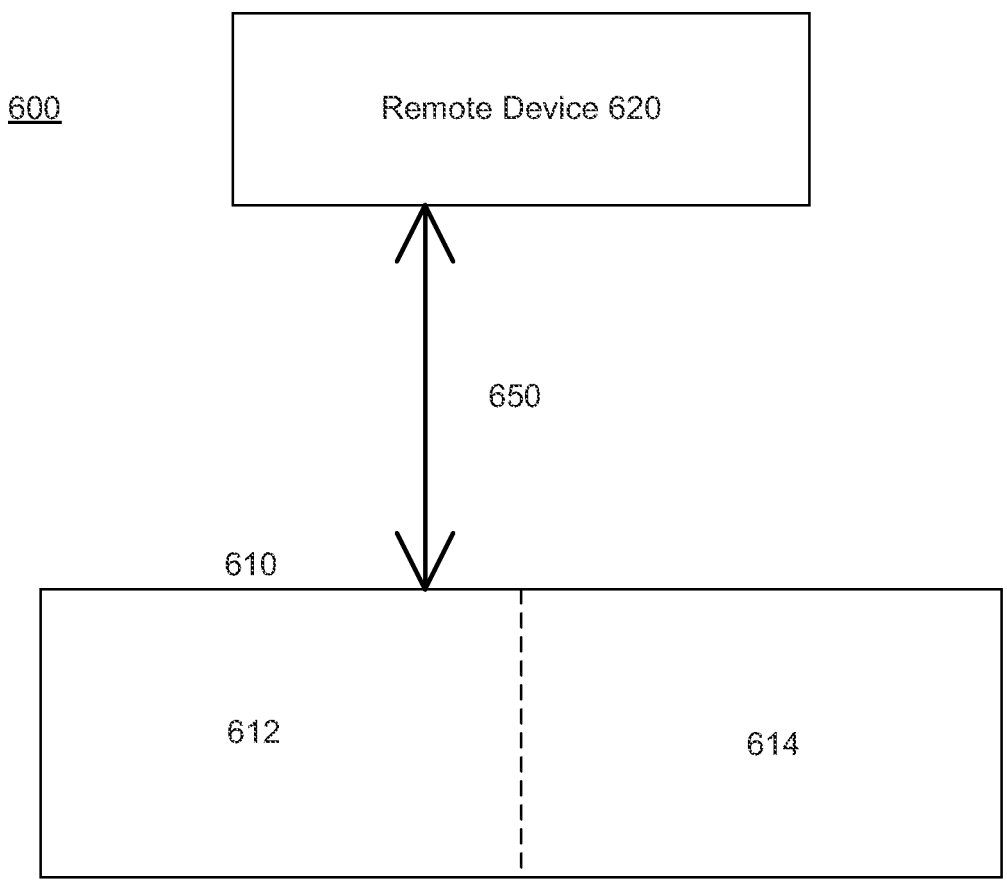
FIG. 6 illustrates a wearable computing device communicatively coupled to a remote device according to an embodiment of the invention.

FIG. 6 illustrates a wearable computing device communicatively coupled to a remote device according to an embodiment of the invention. System 600 includes wearable computing device 610 and remote device 620 communicatively coupled via communication link 650. Link 650 may comprise a wired or wireless connection. Wearable computing device 610 is shown to comprise two sections—612 and 614, which may be coupled via any of the hinge assembly means described above.

Wearable computing device 610 may comprise any of the described or inferred embodiments discussed above. Remote device 620 may exchange data with device 610 via link 650. In embodiments where link 650 is not a wireless connection, remote device 620 may be communicatively coupled to device 610 a data connector port/plug included in section 612.

Remote device 620 may comprise any type of computing device or transmitter including a laptop computer, a mobile telephone, etc., that is configured to exchange data with wearable device 610. Remote device 620 and device 610 may each contain hardware to enable communication link 650, such as processors, transmitters, receivers, antennas, etc.

For example, communication link 650 may comprise a wired link via a serial bus such as a universal serial bus or a parallel bus; communication link 650 may also comprise a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or among other possibilities.

Various components referred to above as processes, servers, or tools described herein may be a means for performing the functions described. Each component described herein includes software or hardware, or a combination of these. Each and all components may be implemented as logic such as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

A computer readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable non-transitory storage medium may also include a storage or database from which content can be downloaded. Said computer readable medium may also include a device or product having content stored thereon at a time of sale or delivery. Thus, delivering a device with stored content, or offering content for download over a communication medium may be understood as providing an article of manufacture with such content described herein.

Embodiments of the invention describe devices that may comprise a hinge assembly to rotatably couple a first housing to a second housing, wherein an interconnect extends through the hinge assembly as an incorporated portion of the hinge assembly, the interconnect to communicatively couple a component located in the first housing to a component located in a second housing.

In some embodiments, the hinge assembly further comprises a non-conductive material and the interconnect comprises traces of a conductive material etched into the non-conductive material. In some embodiments, the hinge assembly further comprises a first conductive material and the interconnect comprises a second conductive material, and wherein the interconnect is affixed to the hinge through lamination, a lamination material providing an insulating layer between the first conductive material and the second conductive material.

In some embodiments, the hinge assembly comprises a rotating hinge, including a first member, a second member, and bearing to rotate the first member towards and away from the second member; in these embodiments, the interconnect comprises, a set of conductive grooves disposed on the first member, and a set of conductive lines extending from the second member and into the conductive grooves of the first member, wherein the set of conductive grooves and the set of conductive lines are disposed around the bearing.

In some embodiments, the hinge assembly comprises a rotating hinge, including a first member having a first bearing portion, a second member having a second bearing portion, wherein the first and second bearing portions form a bearing to rotate the first member towards and away from the second member; in these embodiments, the interconnect comprises a set of conductive grooves disposed on the first bearing portion of the first member, and a set of conductive lines extending from the second bearing portion of the second member and into the conductive grooves of the first bearing portion of the first member.

In some embodiments, the hinge assembly comprises a folding hinge. In some embodiments, the interconnect comprises an electrical interconnect comprising at least one of metal or semiconductor material. In some of these embodiments, the first housing includes a power supply, and the interconnect to further transfer power between the first housing and the second housing.

In some embodiments, the interconnect comprises an optical interconnect comprising an optical fiber having a waveguide core. In some embodiments, the interconnect extends through the hinge assembly when the first and second housings are moved towards and away from one another. In some embodiments, the interconnect extends through the hinge assembly when the first and second housings are moved towards one another, and does not extend through the hinge assembly when the first and second housings are moved away from one another.

Embodiments of the invention further describe mobile computing systems having a first housing including a first computing component, a second housing including a second computing component, and a hinge assembly to rotatably couple the first housing to the second housing, wherein an interconnect extends through the hinge assembly as an incorporated portion of the hinge assembly, the interconnect to communicatively couple the first computing component located in the first housing to the second computing component located in a second housing.

In some embodiments, the hinge assembly further comprises a non-conductive material and the interconnect comprises traces of a conductive material etched into the non-conductive material. In some embodiments, the hinge assembly further comprises a first conductive material and the interconnect comprises a second conductive material, and wherein the interconnect is affixed to the hinge through lamination, a lamination material providing an insulating layer between the first conductive material and the second conductive material.

In some embodiments, the hinge assembly comprises a rotating hinge, including a first member, a second member, and bearing to rotate the first member towards and away from the second member; in these embodiments, the interconnect comprises a set of conductive grooves disposed on the first member, and a set of conductive lines extending from the second member and into the conductive grooves of the first member, wherein the set of conductive grooves and the set of conductive lines are disposed around the bearing.

In some embodiments, the hinge assembly comprises a rotating hinge, including a first member having a first bearing portion, a second member having a second bearing portion, wherein the first and second bearing portions form a bearing to rotate the first member towards and away from the second member; in these embodiments, the interconnect comprises a set of conductive grooves disposed on the first bearing portion of the first member, and a set of conductive lines extending from the second bearing portion of the second member and into the conductive grooves of the first bearing portion of the first member.

In some embodiments, the interconnect comprises an electrical interconnect comprising at least one of metal or semiconductor material, wherein the first housing further includes a power supply, and the interconnect to further transfer power between the first housing and the second housing. In some embodiments, the interconnect comprises an optical interconnect comprising an optical fiber having a waveguide core.

In some embodiments, the mobile computing system comprises a wearable computing system, and wherein the first housing and the second housing are included in a wearable band for wearing on a wrist of a user. In other embodiments, the mobile computing system comprises an optical head mounted display, and the first housing and the second housing are included in an eyeglass frame assembly.

Embodiments of the invention describe devices for rotatably coupling two or more housings that may comprise a hinge assembly to rotatably couple a first housing to a second housing, wherein an interconnect extends through the hinge assembly as an incorporated portion of the hinge assembly, the interconnect to communicatively couple a component located in the first housing to a component located in a second housing.

Embodiments describe mobile systems having computing components included in rotatably coupled housings comprising a first housing including a first computing component, a second housing including a second computing component, and a hinge assembly to rotatably couple the first housing to the second housing, wherein an interconnect extends through the hinge assembly as an incorporated portion of the hinge assembly, the interconnect to communicatively couple the first computing component located in the first housing to the second computing component located in a second housing.

The invention claimed is:

1. A device comprising:
a hinge assembly to rotatably couple a first housing to a second housing, wherein an interconnect extends through the hinge assembly as an incorporated portion of the hinge assembly, the interconnect to communicatively couple a component located in the first housing to a component located in a second housing;
wherein the hinge assembly further comprises a first conductive material and the interconnect comprises a second conductive material, and wherein the interconnect is affixed to the hinge through lamination, a lamination material providing an insulating layer between the first conductive material and the second conductive material.

2. The device of claim 1, wherein the hinge assembly comprises a folding hinge.

3. The device of claim 1, wherein the interconnect comprises an electrical interconnect comprising at least one of metal or semiconductor material.

4. The device of claim 3, wherein the first housing includes a power supply, and the interconnect to further transfer power between the first housing and the second housing.

5. The device of claim 1, wherein the interconnect extends through the hinge assembly when the first and second housings are moved towards and away from one another.

6. A mobile system comprising:
a first housing including a first computing component;
a second housing including a second computing component; and
a hinge assembly to rotatably couple the first housing to the second housing, wherein an interconnect extends through the hinge assembly as an incorporated portion of the hinge assembly, the interconnect to communicatively couple the first computing component located in the first housing to the second computing component located in a second housing;
wherein the hinge assembly further comprises a first conductive material and the interconnect comprises a second conductive material, and wherein the interconnect is affixed to the hinge through lamination, a lamination material providing an insulating layer between the first conductive material and the second conductive material.

7. The mobile system of claim 6, wherein the interconnect comprises an electrical interconnect comprising at least one of metal or semiconductor material, wherein the first housing further includes a power supply, and the interconnect to further transfer power between the first housing and the second housing.

8. The mobile system of claim 6, wherein mobile computing system comprises a wearable computing system, and wherein the first housing and the second housing are included in a wearable band for wearing on a wrist of a user.

9. The mobile system of claim 6, wherein the mobile computing system comprises an optical head mounted display, and the first housing and the second housing are included in an eyeglass frame assembly.

10. A device comprising:
a hinge assembly to rotatably couple a first housing to a second housing, wherein an interconnect extends through the hinge assembly as an incorporated portion of the hinge assembly, the interconnect to communicatively couple a component located in the first housing to a component located in a second housing;
wherein the hinge assembly comprises a rotating hinge, the rotating hinge including either:
a first member, a second member, and bearing to rotate the first member towards and away from the second member, and wherein the interconnect comprises a set of conductive grooves disposed on the first member and a set of conductive lines extending from the second member and into the conductive grooves of the first member, wherein the set of conductive grooves and the set of conductive lines are disposed around the bearing; or
a first member having a first bearing portion and a second member having a second bearing portion, wherein the first and second bearing portions form a bearing to rotate the first member towards and away from the second member, and wherein the interconnect comprises a set of conductive grooves disposed on the first bearing portion of the first member and a set of conductive lines extending from the second bearing portion of the second member and into the conductive grooves of the first bearing portion of the first member.

11. A device comprising:
a hinge assembly to rotatably couple a first housing to a second housing, wherein an interconnect extends through the hinge assembly as an incorporated portion of the hinge assembly, the interconnect to communicatively couple a component located in the first housing to a component located in a second housing;
wherein the interconnect extends through the hinge assembly when the first and second housings are moved towards one another, and does not extend through the hinge assembly when the first and second housings are moved away from one another.

12. The device of claim 11, wherein the interconnect comprises an optical interconnect comprising an optical fiber having a waveguide core.

13. A mobile system comprising:
a first housing including a first computing component;
a second housing including a second computing component; and
a hinge assembly to rotatably couple the first housing to the second housing, wherein an interconnect extends through the hinge assembly as an incorporated portion of the hinge assembly, the interconnect to communicatively couple the first computing component located in the first housing to the second computing component located in a second housing;
wherein the hinge assembly comprises a rotating hinge, the rotating hinge including either:
a first member, a second member, and bearing to rotate the first member towards and away from the second member, and wherein the interconnect comprises a set of conductive grooves disposed on the first member and a set of conductive lines extending from the second member and into the conductive grooves of the first member, wherein the set of conductive grooves and the set of conductive lines are disposed around the bearing; or
a first member having a first bearing portion and a second member having a second bearing portion, wherein the first and second bearing portions form a bearing to rotate the first member towards and away from the second member, and wherein the interconnect comprises a set of conductive grooves disposed on the first bearing portion of the first member and a set of conductive lines extending from the second bearing portion of the second member and into the conductive grooves of the first bearing portion of the first member.

14. A mobile system comprising:
a first housing including a first computing component;
a second housing including a second computing component; and
a hinge assembly to rotatably couple the first housing to the second housing, wherein an interconnect extends through the hinge assembly as an incorporated portion of the hinge assembly, the interconnect to communicatively couple the first computing component located in the first housing to the second computing component located in a second housing;
wherein the interconnect extends through the hinge assembly when the first and second housings are moved towards one another, and does not extend through the hinge assembly when the first and second housings are moved away from one another.

15. The mobile system of claim 14, wherein the interconnect comprises an optical interconnect comprising an optical fiber having a waveguide core.

* * * * *